(12) United States Patent  
Kageyama et al.

(10) Patent No.: US 9,539,963 B2  
(45) Date of Patent: Jan. 10, 2017

(54) BATTERY SYSTEM AND METHOD OF OPERATING THE BATTERY SYSTEM

(71) Applicant: KABUSHIKI KAISHA TOSHIBA, Tokyo (JP)

(72) Inventors: Tomomi Kageyama, Tokyo (JP); Hiroyuki Kobayashi, Yokohama (JP); Fujio Nomura, Kawasaki (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 682 days.

(21) Appl. No.: 13/743,587

(22) Filed: Jan. 17, 2013

(65) Prior Publication Data

US 2013/0249278 A1    Sep. 26, 2013

(30) Foreign Application Priority Data

Mar. 23, 2012    (JP) ................................ 2012-067850

(51) Int. Cl.
*B60L 1/00*       (2006.01)
*B60L 3/00*       (2006.01)
(Continued)

(52) U.S. Cl.
CPC .......... *B60R 16/033* (2013.01); *H01M 10/052* (2013.01); *H01M 10/4207* (2013.01);
(Continued)

(58) Field of Classification Search
CPC ........... H01M 10/46; H02J 7/00; B60R 16/03; B60L 11/14; Y02T 19/7005
(Continued)

(56) References Cited

U.S. PATENT DOCUMENTS 8,698,351 B2 *  4/2014  Castelaz ............... H02J 4/00  
                                              307/25
2004/0164706 A1 * 8/2004  Osborne .............. H02J 7/0018  
                                              320/116

(Continued)

FOREIGN PATENT DOCUMENTS

DE    10 2008 038 860 A1    3/2010
DE    10 2010 041 024 A1    3/2012
(Continued)

OTHER PUBLICATIONS

The Extended European Search Report issued Jun. 28, 2013, in Application No. / Patent No. 13152392.0-1359.

(Continued)

*Primary Examiner* — Rexford Barnie
*Assistant Examiner* — Jagdeep Dhillon
(74) *Attorney, Agent, or Firm* — Oblon, McClelland, Maier & Neustadt, L.L.P.

(57) ABSTRACT

In a battery system for use in a vehicle as power supply, a plurality of battery groups, each configured to output a rated voltage while being charged, in parallel to an input/output system line by a system connection device, BMU devices monitor the battery groups, respectively, determining whether the battery groups enter an abnormal state, and any battery group entering the abnormal state is designated and disconnected from the input/output system line. If a predetermined of battery groups are found to enter an abnormal state, as determined by the BMU devices, a system controller generates an alarm, informing the user that the battery system may not provide power in the required amount.

7 Claims, 6 Drawing Sheets

(51) Int. Cl.
*H02G 3/00* (2006.01)
*B60R 16/033* (2006.01)
*H01M 10/052* (2010.01)
*H01M 10/42* (2006.01)
*H01M 10/48* (2006.01)
*H02J 7/00* (2006.01)

(52) U.S. Cl.
CPC ......... *H01M 10/482* (2013.01); *H02J 7/0024* (2013.01); *H01M 10/488* (2013.01); *H01M 2010/4271* (2013.01); *H01M 2010/4278* (2013.01); *H02J 7/0021* (2013.01); *Y02E 60/122* (2013.01); *Y02T 10/7055* (2013.01)

(58) Field of Classification Search
USPC ............. 307/9.1, 10.1–107, 80, 86, 43, 109; 320/109, 101.103, 116, 118
See application file for complete search history.

(56) References Cited

U.S. PATENT DOCUMENTS

| | | |
|---|---|---|
| 2009/0195217 A1 | 8/2009 | Choi et al. |
| 2009/0206798 A1 | 8/2009 | Choi et al. |
| 2009/0214912 A1* | 8/2009 | Horiguchi ............. G03B 17/18 429/410 |
| 2011/0234150 A1* | 9/2011 | Furukawa ............. H02J 7/0027 320/101 |
| 2011/0298626 A1* | 12/2011 | Fechalos ............. H01M 10/482 340/664 |
| 2012/0105001 A1* | 5/2012 | Gallegos ............... B60L 3/0046 320/109 |
| 2012/0179411 A1* | 7/2012 | Sugimura ............. G01R 35/00 702/117 |

FOREIGN PATENT DOCUMENTS

| | | |
|---|---|---|
| EP | 2 369 712 A1 | 9/2011 |
| JP | 2001-268814 A | 9/2001 |
| JP | 2007-28837 | 2/2007 |
| JP | 2007-259612 A | 10/2007 |
| JP | 2008-228518 A | 9/2008 |
| JP | 2010-273417 A | 12/2010 |
| JP | 2011-129327 A | 6/2011 |

OTHER PUBLICATIONS

Office Action issued May 12, 2015 in Japanese Patent Application No. 2013-017605 (with English language translation).

Office Action issued Jan. 5, 2016 in Japanese Patent Application No. 2013-017605 (with English language translation).

* cited by examiner

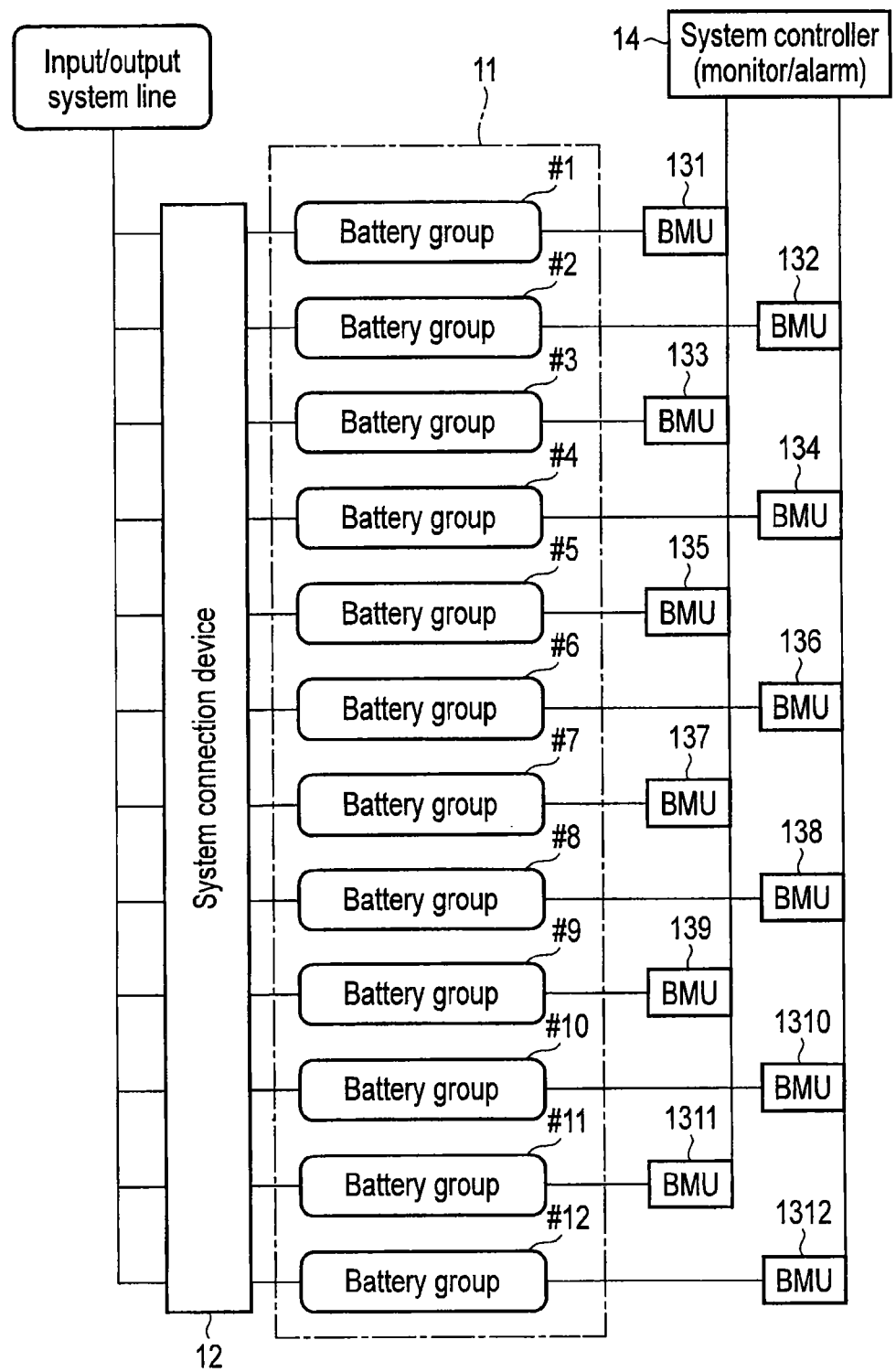
F I G. 1

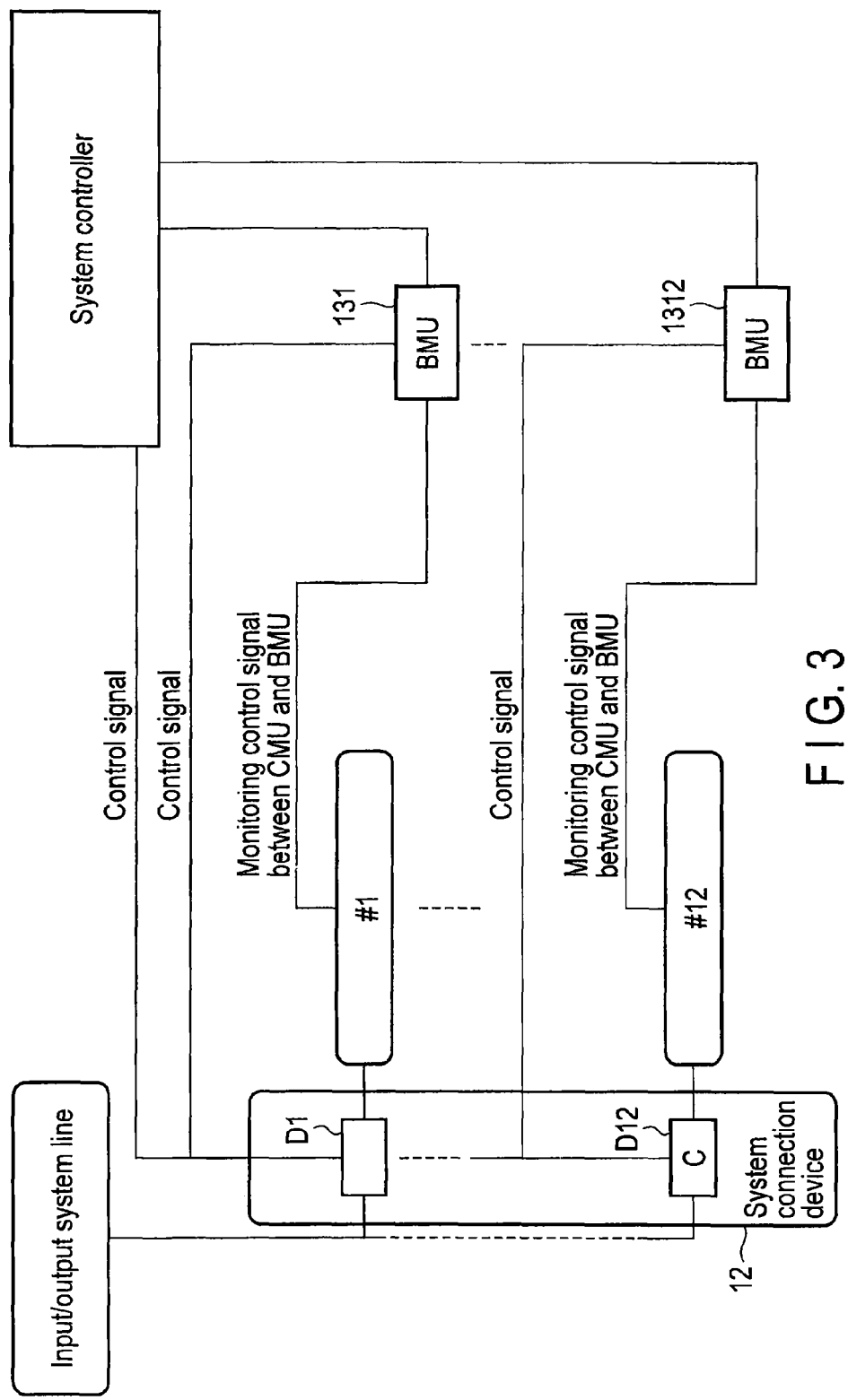
F I G. 3

BATTERY SYSTEM AND METHOD OF OPERATING THE BATTERY SYSTEM

CROSS-REFERENCE TO RELATED APPLICATIONS

This application is based upon and claims the benefit of priority from Japanese Patent Application No. 2012-067850, filed Mar. 23, 2012, the entire contents of which are incorporated herein by reference.

FIELD

Embodiments described herein relate generally to a battery system for use in a vehicle as power supply, and to a method of operating the battery system.

BACKGROUND

The battery system for use in vehicles is generally a double-redundancy system in consideration of abnormality that may develop while the system is operating. The double-redundancy system comprises a main battery unit and an auxiliary battery unit totally identical to the main battery unit. In operation, the battery system fails to output the rated power even if only one of the battery modules constituting the main battery unit enters an abnormal state. In this case, the main battery unit is disconnected from the output system, and the auxiliary battery unit is connected to the output system and used in place of the main battery unit. Inevitably, twice as many battery modules must be mounted on the vehicle in order to provide the rated power.

The battery system, particularly one mounted on a special vehicle, such as a submersible vehicle and a flight vehicle, should keep operating once it has been started. Therefore, the battery modules cannot be replaced by other modules. Thus, each battery module must have high reliability. The reliability of the battery module is, however, technically limited.

BRIEF DESCRIPTION OF THE DRAWINGS

FIG. 1 is a block diagram showing the configuration of a battery system according to an embodiment;

FIG. 3 is a block diagram showing the configuration of the system connection device shown in FIG. 1;

DETAILED DESCRIPTION

In general, according to one embodiment, a battery system for use in a vehicle as power supply is provided. The system comprises a plurality of battery groups, a system connection device and a controller. Each of battery groups is configured to output a rated voltage while being charged. The system connection device connects the battery groups in parallel to an input/output system line and is configured to designate a battery group in accordance with a control instruction and to disconnect the battery group, so designated, from the input/output system line. The controller monitors the battery groups, thereby determining whether the battery groups enter an abnormal state, designates any battery group entering the abnormal state and instructs the system connection device to disconnect the battery group, so designated, from the input/output system line.

An embodiment will be described below, with reference to the accompanying drawings.

FIG. 1 is a block diagram showing the configuration of a battery system according to the embodiment. As shown in FIG. 1, the battery system comprises a battery unit 11 composed of first to twelfth battery groups #N (N ranges from 1 to 12). The first to twelfth battery groups #N are connected in parallel to an input/output system line, by a system connection device 12. The system connection device 12 has the function of disconnecting any battery group #i (where i ranges from 1 to 12) from the input/output system line. In this embodiment, nine battery groups can provide electric power required, and at most three battery groups can be disconnected from the input/output system line.

The first to twelfth battery groups #N are connected to a system controller 14 by battery monitoring unit (BMU) devices 13$i$ (i ranges from 1 to 12), respectively, respectively. The first to twelfth battery groups #N are controlled by the BMU devices 13N and the system controller 14. The BMU devices 13$i$ monitor the battery groups #i, respectively, determining whether the battery groups enter an abnormal state. If any BMU device 13$i$ detects that the battery group #i associated with it enters the abnormal state, it instructs the system connection device 12 to disconnect the battery group #i from the input/output system line, and informs the system controller 14 that the battery groups #i enters the abnormal state. From the monitoring results coming from the BMU devices 13N, the system controller 14 determines the operating state of the entire system, and causes a monitor to display the operating state to the user. The system controller 14 generates an alarm if a prescribed number of battery groups have been disconnected from the input/output system line. Not the BMU devices 13N, but the system controller 14 may directly instruct the disconnection of any battery group from the input/output system line.

Figure 2:
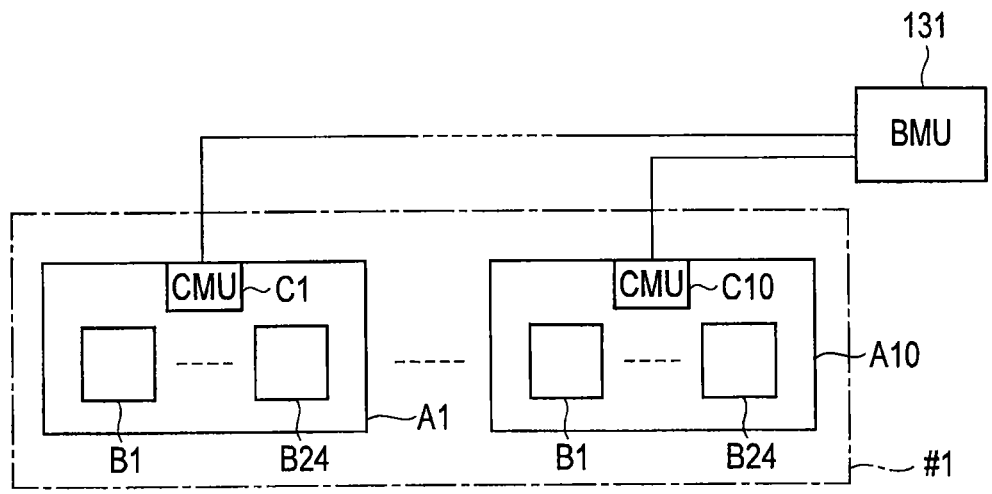
FIG. 2 is a block diagram specifying the configuration of one of the battery groups incorporated in the battery unit shown in FIG. 1.

FIG. 2 is a block diagram specifying the configuration of the first battery group #1. As shown in FIG. 2, the first battery group #1 comprises first to tenth battery modules Am (m ranging from 1 to 10) connected in series. Each battery module Am comprises a serial circuit of first to 24th battery cells Bn (n ranging from 1 to 24), each being, for example, a lithium ion cell. The battery module Am further comprises a cell monitoring unit (CMU) device Cm (m ranges from 1 to 10). The monitoring result of the CMU device Cm is reported, at regular intervals, to the BMU device 131. The other battery groups #2 to #12 have the same configuration as the first battery group #1.

Figure 4:
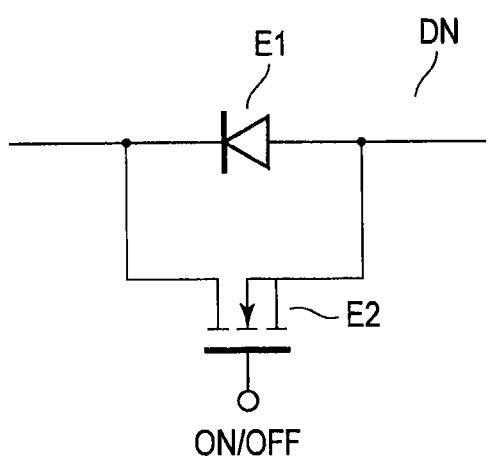
FIG. 4 is a circuit diagram showing the configuration of the contactors shown in FIG. 3.

FIG. 3 is a block diagram showing the configuration of the system connection device 12 described above. As FIG. 3 shows, the system connection device 12 comprises contactors (coupling switches) DN (N ranging from 1 to 12), each connected at input terminal to one battery group #N and at the output terminal to the input/output system line. As shown in FIG. 4, each contactor DN comprises a backflow checking diode E1 and a switch element E2, i.e., an FET, which is connected in parallel to the diode E1. The switch element E2 normally remains on, electrically charging or discharging the associated battery group #i. When the battery group #i enters an abnormal state, the switch element E2 is turned off, disconnecting the battery group #i from the input/output system line. Having the backflow checking diode E1, the contactor DN prevents the current output from any other battery group to the battery group #i through the switch element E2. This avoids a temporary voltage drop at the time of operating the switch element E2.

How the battery system described above operates will be explained below.

First, the system connection device 12 performs a disconnecting function, an instantaneous-disconnection preventing function, and a state-maintaining function on any battery group #N, cooperating with the BMU devices 13N and the system controller 14.

The disconnecting function is to keep detecting the operating state of the output system and the operating state of each battery group and disconnect any battery group #i detected to have a problem, from the input/output system line, thereby preventing the battery group #i from influencing the other battery groups. The instantaneous-disconnection preventing function is to make each battery group #N resistant to an instantaneous current (several kA), thereby dispersing an abnormal current and, ultimately resistant to impacts, since a current may flow instantaneously in the other battery groups having no problems if the battery group #N is not so resistant. The state-maintaining function is to keep any battery group #1 once disconnected, disconnected from the input/output system line, or preventing the same from being connected again to the input/output line again even if power is no longer supplied to the battery system.

Each BMU device 13N acquires the monitoring data from the CMU device Cm provided in the associated battery module Am. If a normal state is detected in the battery module Am, the BMU device 13N instructs the system connection device 12 to disconnect the battery module Am, and then informs the system controller 14 that battery module Am enters the abnormal state. The system controller 14 has a function of analyzing the monitoring data supplied from the BMU device 13N and performing necessary control on the other components of the battery system.

Figure 5:
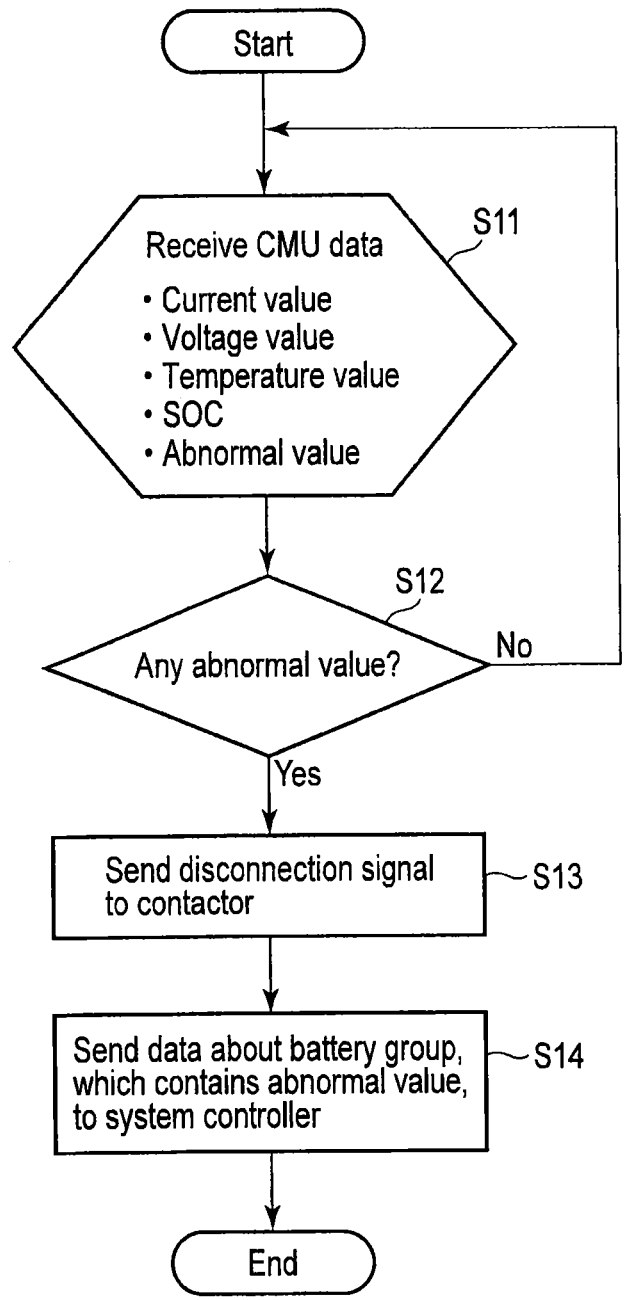
FIG. 5 is a flowchart specifying a process performed by the BMU devices shown in FIG. 1.

FIG. 5 is a flowchart specifying a process performed by one of the BMU devices 13N shown in FIG. 1. First, the BMU device 13N receives CMU data periodically sent from the CMU device Cm provided in the associated battery module Am (Step S11). The CMU data contains current, voltage, temperature, state-of-charge (SOC) and abnormal-state data. Then, the BMU device 13N determines whether any item of the CMU data constitutes an abnormal value (Step S12). If any abnormal value is detected in the CMU data, the BMU device 13N sends a control signal to the associated contactor DN of the system connection device 12, instructing the contactor DN to disconnect the battery module Am from the input/output system line (Step S13). The BMU device 13N further sends the data about the battery group, which contains the abnormal value, to the system controller 14 (Step S14).

Figure 6:
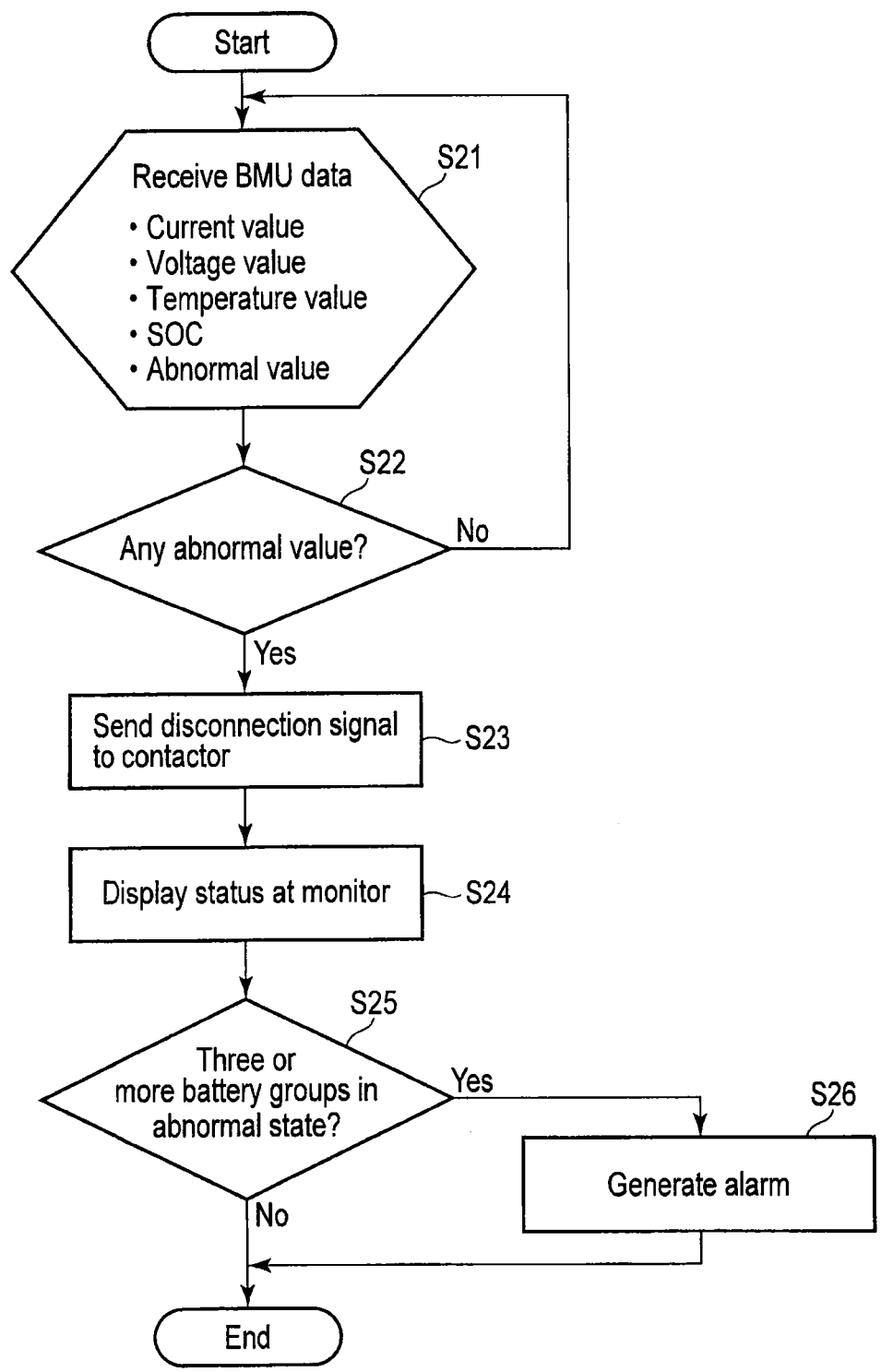
FIG. 6 is a flowchart specifying a process performed by the system controller shown in FIG. 1.

FIG. 6 is a flowchart specifying a process performed by the system controller 14. More precisely, FIG. 6 explains how the system controller 14 directly controls the system connection device 12.

At first, the system controller 14 receives the CMU data acquired by the BMU devices 13N associated with the respective battery groups #N (Step S21). As described above, the CMU data acquired by each BMU device 13N contains current, voltage, temperature, state-of-charge (SOC) and abnormal values. Then, the system controller 14 determines whether any item of the CMU data constitutes an abnormal value (Step S22). If any abnormal value is detected in the CMU data, the system controller 14 sends a control signal to the associated contactor DN of the system connection device 12, instructing the contactor DN to disconnect the battery module Am from the input/output system line (Step S23). The system controller 14 further causes a monitor to display the operating status of the associated battery group #N (Step S24). At the same time, the system controller 14 determines whether three or more battery groups #N enter an abnormal state (Step S25). If three or more battery groups #N are found to enter an abnormal state, the system controller 14 generates an alarm, informing the user that the battery system may not provide power in the required amount (Step S26).

As has been described, in the battery system according to the embodiment so configured as specified above, the battery groups generating the rated voltage are connected in parallel and monitored for any possible abnormal state, and any battery module found to enter an abnormal state is disconnected from the input/output system line. In the battery system so configured, the number of battery groups connected can be controlled. Therefore, the twice as many battery groups need not be used to provide the rated power as in the conventional battery system. This helps to make the battery system smaller and lighter. Further, since the instantaneous disconnection of any battery group is prevented, the change in the output power can be suppressed even if any battery group is disconnected while the battery system is operating. Still further, any battery group #1 once disconnected since any battery group enters an abnormal state remains disconnected from the input/output system line, or is prevented from being connected again thereto even if power is no longer supplied to the battery system. As a result, the battery system is more reliable than otherwise. In addition, if more battery groups than a preset number have been disconnected from the input/output system line, an alarm will be generated, informing the user that the battery system may not provide power in the required amount.

Moreover, since all battery groups, including the spare ones, are used at all times (except any disconnected from the input/output system line), they hold the same remaining power. This imposes no influence on additional battery groups are incorporated in the battery unit 11, enhancing the reliability of the battery system according to the embodiment.

The battery system according to the embodiment keeps operating in normal way until the power it provides decreases to the minimum amount required. Even if the power decreases to the minimum amount, however, the system keeps outputting the voltage required because the battery groups are connected in parallel. Hence, the battery system can undergo a degraded operation (that is, it operates for a shorter time than normal). In some cases, the load capacitance may be limited or reduced when the capacitance required decreases.

The embodiment described above has twelve battery groups (N=12). In the embodiment, each battery group has of ten battery modules (m=10), each battery module has twenty-four battery cells (n=24), and at most three battery groups can be disconnected from the input/output system line. These numbers, which are nothing more than examples, can be changed as needed.

In the state-maintaining process, any battery group found entering an abnormal state and therefore disconnected may be replaced with a new battery group, thereby performing a restoring process as described below.

Figure 7:
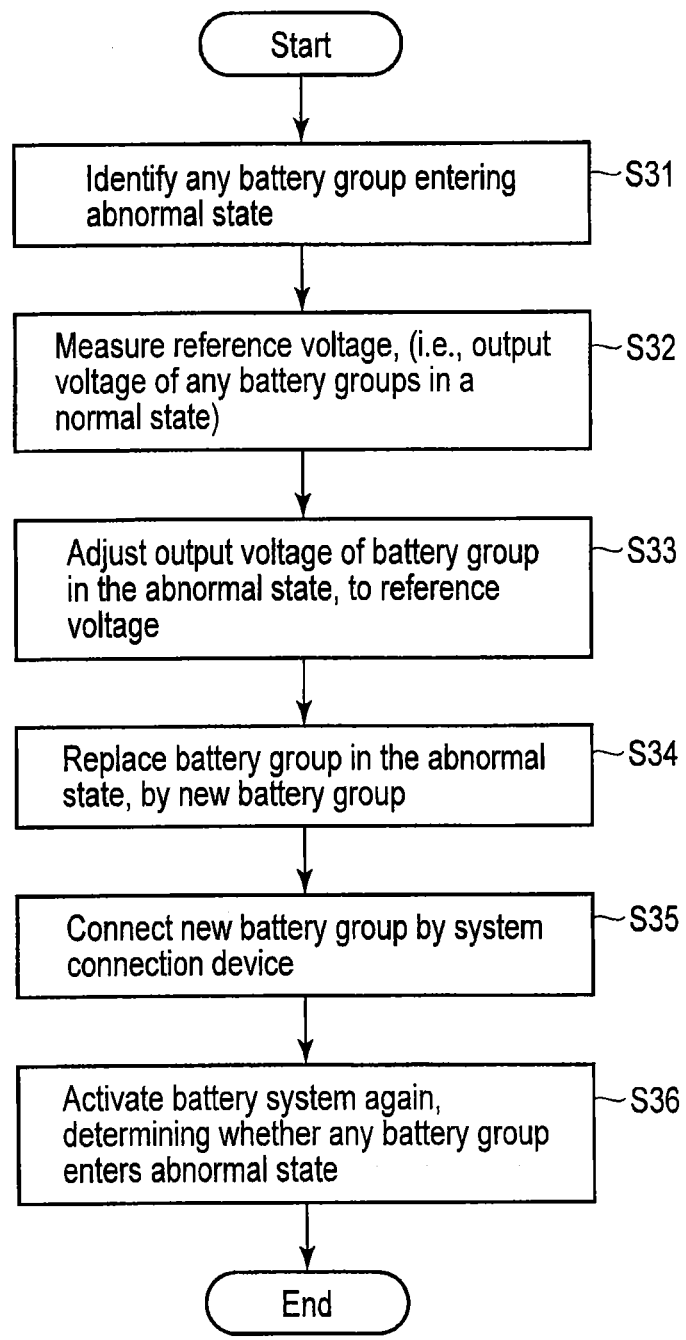
FIG. 7 is a flowchart showing the sequence of the restoring process of replacing any defective battery group entering an abnormal state, with a new one in the battery system of FIG. 1.

FIG. 7 shows the sequence of the restoring process of replacing any defective battery group with a new one. In order to start the restoring process, any battery group entering an abnormal state is identified from the status data held in the system controller 14 (Step S31). Next, the output voltage of the battery groups in a normal state is measured as a reference voltage (Step S32). Then, the battery group in the abnormal state, which should be replaced by a new one, is adjusted to output a voltage that is half the reference value (Step S33). The battery group in the abnormal state is replaced by a new battery group (Step S34). The new battery group is connected to the associated contactor of the system connection device 12 (thereby set to on state) (Step S35). Finally, the battery system is activated again, thereby determining whether any battery group enters an abnormal state (Step S36).

In the restoring process performed in the sequence specified above, any battery group in an abnormal state is replaced by a new one, while its output voltage remains adjusted to the output voltage of any battery group entering the normal state. Hence, the battery group in an abnormal state can be replaced by a new one, while preventing any damage that may result from the voltage difference that is otherwise be observed between the battery groups while the battery group is being replaced by a new one.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery system for use in a vehicle as power supply, the system comprising:
    a plurality of battery groups connected in parallel to one another and individually connected to an input/output system line, each of the battery groups being configured to output a rated voltage while being charged, and including a defined number of battery modules connected in series;
    a plurality of coupling switches at respective ones of the battery groups, each of the plurality of coupling switches being configured to disconnect a corresponding battery group from the input/output system line in accordance with a control signal of disconnection; and
    a plurality of monitoring controllers at the respective ones of the battery groups, each of the monitoring controllers being configured to issue the control signal of disconnection to a corresponding one of the coupling switches at a respective one of the battery groups,
    each of the battery modules comprising a defined number of serially connected battery cells and a cell monitoring unit configured to monitor an operation state of the serially connected battery cells, and
    each of the monitoring controllers being configured to be notified from a corresponding one of the cell monitoring units of the operation state of the serially connected battery cells in a corresponding one of the battery groups, to determine, based on the notified operation state, whether the corresponding one of the battery groups enters an abnormal state, and to disconnect the corresponding one of the battery groups from the input/output system line upon determining that the corresponding one of the battery groups is in the abnormal state.

2. The battery system of claim 1, further comprising a plurality of backflow preventing devices provided between the battery groups and the input/output system line, the backflow preventing devices configured to prevent a backflow of a current from the input/output system line to the battery group when any battery group is disconnected in accordance with the control signal.

3. The battery system of claim 1, further comprising a system controller configured to cause a monitor to display a monitoring result of each of the monitoring controllers.

4. The battery system of claim 1, further comprising a system controller configured to generate an alarm when more battery groups than a prescribed number are found to enter the abnormal state based on a monitoring result of each of the monitoring controllers.

5. The battery system of claim 1, wherein each of the battery cells is a lithium ion cell.

6. A method of operating a battery system installed in a vehicle as power supply and comprising a plurality of battery groups connected in parallel to one another and individually connected to an input/output system line, each of the battery groups configured to output a rated voltage while being charged,
    each of the battery groups comprising a defined number of battery modules connected in series, a coupling switch configured to break a connection with the input/output system line in accordance with a control signal of disconnection, and a monitoring controller configured to issue the control signal of disconnection to the coupling switch,
    each of the battery modules comprising a defined number of serially connected battery cells and a cell monitoring unit configured to monitor an operation state of the serially connected battery cells,
    the method comprising:
    controlling the cell monitoring unit in each of the battery modules to monitor the operation state of the battery cells in each of the battery modules; and
    controlling every one of the monitoring controllers to determine whether a corresponding one of the battery cell groups enters an abnormal state, and to issue the control signal of disconnection to a corresponding one of the coupling switches upon determining that the battery group concerned is in the abnormal state, thereby disconnecting the battery group concerned from the input/output system line.

7. The battery system of claim 1, wherein any battery group entering the abnormal state and therefore disconnected is replaced by a new one after the output voltage of the battery group has been adjusted to the output voltage of any battery group in the normal state.

* * * * *